United States Patent
Nam et al.

(10) Patent No.: US 9,610,855 B2
(45) Date of Patent: Apr. 4, 2017

(54) SLOW CHARGING METHOD AND ON-BOARD CHARGER FOR ENVIRONMENTALLY-FRIENDLY VEHICLE USING THE SAME

(71) Applicant: Hyundai Motor Company, Seoul (KR)

(72) Inventors: Houk Nam, Gyeonggi-do (KR); Chae Mo Yang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 248 days.

(21) Appl. No.: 14/470,142

(22) Filed: Aug. 27, 2014

(65) Prior Publication Data

US 2015/0291043 A1 Oct. 15, 2015

(30) Foreign Application Priority Data

Apr. 14, 2014 (KR) ........................ 10-2014-0044238

(51) Int. Cl.
| | |
|---|---|
| *H02J 7/14* | (2006.01) |
| *B60L 11/18* | (2006.01) |
| *H02J 7/00* | (2006.01) |
| *H02J 7/04* | (2006.01) |

(52) U.S. Cl.
CPC ......... *B60L 11/184* (2013.01); *B60L 11/1848* (2013.01); *H02J 7/0072* (2013.01); *H02J 7/047* (2013.01); *Y02T 10/7005* (2013.01)

(58) Field of Classification Search
CPC ... B60L 11/184; B60L 11/1848; H02J 7/0052; H02J 7/007
USPC .......................... 320/104, 134, 137, 150, 160
See application file for complete search history.

(56) References Cited

U.S. PATENT DOCUMENTS

2010/0156355 A1* 6/2010 Bauerle .................. B60L 3/003
320/145

FOREIGN PATENT DOCUMENTS

| JP | 2012-091728 A | 5/2012 |
|---|---|---|
| JP | 2013-067247 A | 4/2013 |
| KR | 10-1994-0012745 A | 6/1994 |
| KR | 10-1997-0066432 A | 10/1997 |
| KR | 10-2012-0102308 A | 9/2012 |
| KR | 10-2013-0032493 A | 4/2013 |

* cited by examiner

*Primary Examiner* — Edward Tso
*Assistant Examiner* — Aaron Piggush
(74) *Attorney, Agent, or Firm* — Mintz Levin Cohn Ferris Glovsky and Popeo, P.C.; Peter F. Corless (57) ABSTRACT

A slow charging method of a vehicle and an on-board charger using the same are provided that improve charging efficiency and thus save a charging cost by adjusted charging output of the on-board charger based on temperature thereof. The method includes detecting, by a controller, a charging request and detecting temperature of the on-board charger in response to detecting the charging request. The controller is configured to determine whether the temperature of the on-board charger is within a predetermined temperature range and adjust charging an output of the on-board charger to a predetermined value when the temperature of the on-board charger is within the predetermined temperature range. The controller is then configured to charge a battery of the vehicle with the adjusted charging output of the on-board charger.

12 Claims, 6 Drawing Sheets

FIG. 1

RELATED ART

SLOW CHARGING METHOD AND ON-BOARD CHARGER FOR ENVIRONMENTALLY-FRIENDLY VEHICLE USING THE SAME

CROSS-REFERENCE TO RELATED APPLICATION

This application claims priority to and the benefit of Korean Patent Application No. 10-2014-0044238 filed in the Korean Intellectual Property Office on Apr. 14, 2014, the entire contents of which are incorporated herein by reference.

BACKGROUND (a) Field of the Invention

The present invention relates to a slow charging method of an environmentally-friendly vehicle and an on-board charger using the same, and more particularly, to a slow charging method of an environmentally-friendly vehicle and an on-board charger using the same that can improve charging efficiency and thus save a charging cost by changing charging output of the on-board charger based on a temperature thereof.

(b) Description of the Related Art

As is well known in the art, environmentally-friendly vehicles including an electric vehicle, a plug-in vehicle, etc. are driven by utilizing power of a motor operated by battery power. Such environmentally-friendly vehicles may he applied with a plug-in charging method that charges a battery with an external commercial power supply. In the environmentally-friendly vehicle, an on-board charger is installed to rectify the external commercial power supply and to provide slow charging for plug-in charging. The charger installed in the environmentally-friendly vehicle requires additional packaging due to the added elements of the charger which include a high voltage switch, an inductor, a capacitor, an insulated transformer, and a cooling system.

Figure 1:
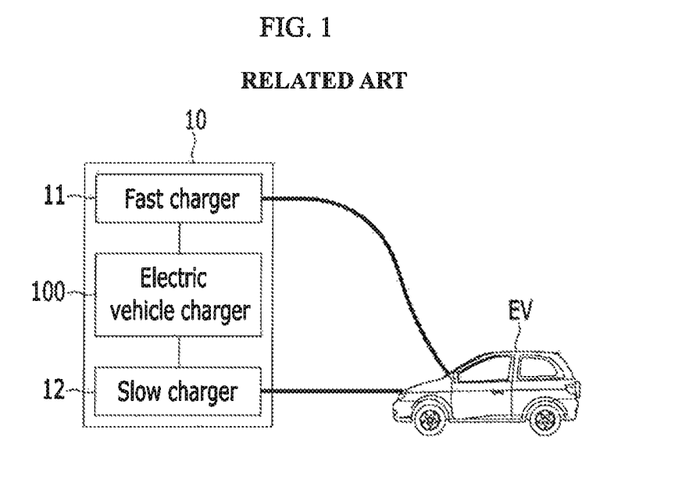
FIG. 1 is an exemplary diagram illustrating an electric vehicle charging station according to the related art.

Further, since respective parts forming the charger are expensive and heavy in weight, increased cost and low fuel efficiency of the environmentally-friendly vehicle may occur due to the increased weight of the charger. The environmentally-friendly vehicle including the on-board charger, for example, is charged, as shown in FIG. 1, in an electric vehicle charging station 10. The electric vehicle charging station 10, as disclosed in the related art, may include a fast charger 11, a slow charger 12, and an electric vehicle charger 100. The electric vehicle charger 100 may be configured to adjust the charging time of the respective chargers 11 and 12 to satisfy charging time requirements of various environmentally-friendly vehicles.

According to the electric vehicle charging station 10 in the related art, a charging method is provided at a minimum cost by implementing a fee for charging power, and a usage fee for using the charging infrastructure, but the charging method cannot be usable at the charging station without the electric vehicle charging station 10 since the on-board charger installed in the vehicle does not adjust the charging. Thus, the electric vehicle charging station 10 in the related art is usable only when it is installed in each charging station, and therefore inconvenience and inefficiency are inevitable when using the electric vehicle charging station 10.

Meanwhile, when charging the battery using the slow charger of the environmentally-friendly vehicle, a higher energy fee is incurred for battery charging energy since efficiency of the on-board charger cannot be 100% when charging the battery. In other words, when the battery is charged using the slow charger, the efficiency deteriorates due to thermal loss of the on-board charger itself, and therefore a higher fee is incurred for actual charging energy. For example, the battery charging energy is about ab.1 kWh (a, b): integer) when charged by the on-board charger with charging capacity of about x.6 kW (x is integer), but when the battery charging energy is about cd.9 kWh (c, d: integer, cd>ab), a user of the environmentally-friendly vehicle is required to pay a charge for cd.9 kWh, which is the energy used by the on-board charger.

The above information disclosed in this section is merely for enhancement of understanding of the background of the invention and therefore it may contain information that does not form the prior art that is already known in this country to a person of ordinary skill in the art.

SUMMARY

The present invention provides a slow charging method of an environmentally-friendly vehicle and an on-board charger using the same that may improve charging efficiency and thus save a charging cost by changing charging output of the on-board charger based on a temperature thereof.

An exemplary embodiment of the present invention provides a slow charging method of an environmentally-friendly vehicle including an on-board charger, that may include: detecting a charging request; detecting a temperature of the on-board charger in response to detecting the charging request; determining whether the temperature of the on-board charger is within a predetermined temperature range; adjusting charging output of the on-board charger to a predetermined value when the temperature of the on-board charger is within the predetermined temperature range; and charging a battery of the environmentally-friendly vehicle with the adjusted charging output of the on-board charger.

The adjusted charging output of the on-board charger may be less than the previous charging output of the on-board charger. The adjusted charging output of the on-board charger may be about 4.4 kW, and the previous charging output of the on-board charger may be about 6.6 kW. A charging time may be greater with the adjusted charging output of the on-board charger than a charging time with the previous charging output thereof. The charging output of the on-board charger may be maintained when the temperature of the on-board charger is beyond the predetermined temperature range. The temperature of the on-board charger may be detected at a predetermined time interval.

An exemplary embodiment of the present invention provides an onboard charger of an environmentally-friendly vehicle, that may include: a temperature sensor configured to detect a temperature of the on-board charger; an output adjuster configured to adjust charging output of the on-board charger; and a controller configured to variably adjust the charging output of the on-board charger based on the temperature the on-board charger, wherein the controller may be configured to execute commands for performing the method described above.

According to the exemplary embodiment of the present invention as described above, the charging output of the on-board charger may be adjusted, based on the temperature of the on-board charger, to improve the efficiency and reduce the charging cost.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not (imitative of the present invention, and wherein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The compute readable recording medium can also be distributed in network, coupled computer systems so that the computer readable media is stored and executed in a distributed fashion, e.g., by a telematics server or a Controller Area Network (CAN).

The terminology used herein is for the purpose of describing particular embodiments only and is not intended to he limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 2:
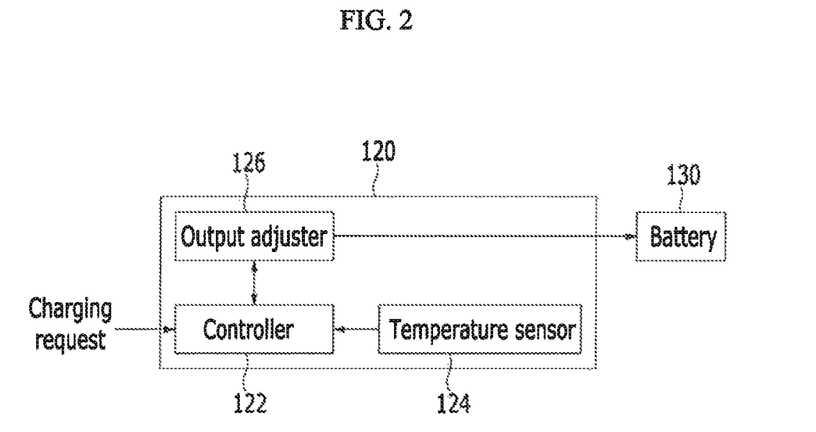
FIG. 2 is an exemplary diagram illustrating an on-board charger of an environmentally-friendly vehicle according to an exemplary embodiment of the present invention.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term"about," The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention. Like reference numerals designate like elements throughout the specification, FIG. 2 is an exemplary diagram illustrating an on-board charger of an environmentally-friendly vehicle according to an exemplary embodiment of the present invention. An on-board charger of an environmentally-friendly vehicle according to an exemplary embodiment of the present invention refers to an on-board charger that may be configured to detect a temperature thereof and adjust charging output based on the detected temperature.

The on-board charger 120 according to the exemplary embodiment of the present invention may include a temperature sensor 124 configured to detect temperature of the on-board charger 120, an output adjuster 126 configured to adjust charging output of the on-board charger 120, and a controller 122 configured to variably adjust the charging output of the on-board charger 120 based on the temperature thereof. In particular, the controller 122 may be configured to operate the temperature sensor 124 and the output adjuster 126. The temperature sensor 124 may be installed within or extraneous to the on-board charger 120 as a sensor configured to detect the temperature of the on-board charger 120 (e.g., a coolant temperature of the on-board charger), but it should be understood that the scope of the present invention is not limited thereto. Even if the configurations are different from the above configuration, the technical spirit of the present invention may be applicable to any configuration that can substantially detect the temperature of the on-board charger 120 (a coolant temperature of the on-board charger).

The output adjuster 126 may include an electronic power device configured to output or variably output the charging power. The controller 122 may be one or more microprocessors and/or hardware including a microprocessor that may be operated by a predetermined program, and the predetermined program may include a series of commands for executing the slow charging method to be described later according to the exemplary embodiment of the present invention. A slow charging method of an environmentally-friendly vehicle according to an exemplary embodiment of the present invention will now be described with reference to the drawings.

Figure 3:
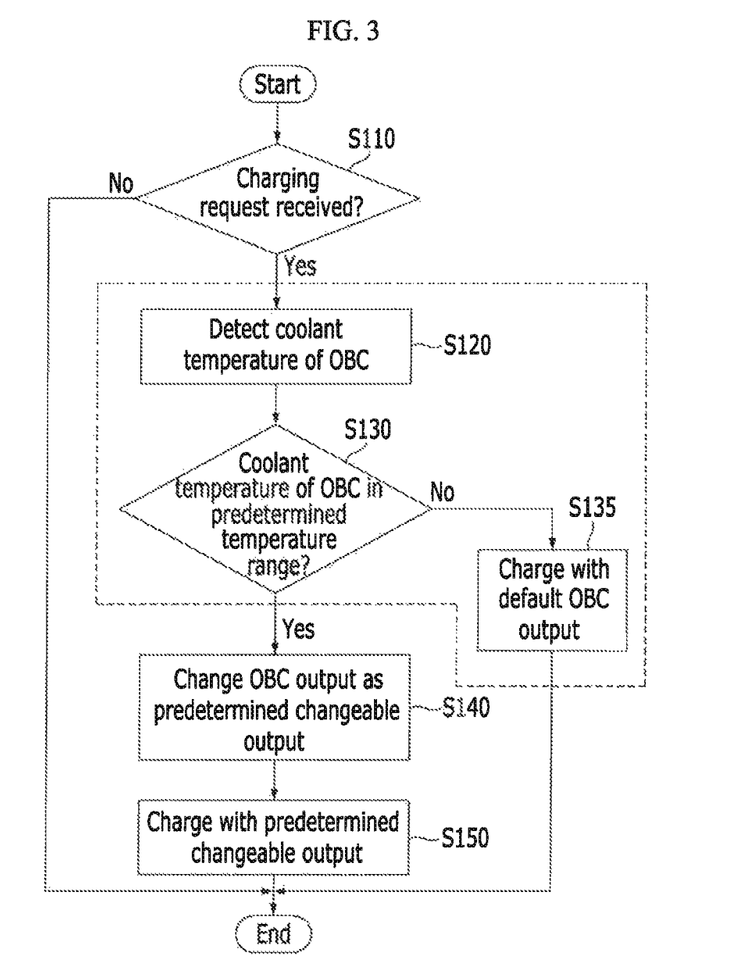
FIG. 3 is an exemplary flowchart illustrating a slow charging method of the environmentally-friendly vehicle according to the exemplary embodiment of the present invention.

FIG. 3 is an exemplary flowchart illustrating a slow charging method of the environmentally-friendly vehicle according to the exemplary embodiment of the present invention. As shown in FIG, 3, a controller 122 may be configured to detect a charging request (S110). The charging request may be generated when a charging plug (not shown)

of a charging station is connected to a charging receptacle (not shown) of the environmentally-friendly vehicle.

Upon detecting the charging request, the controller 122 may be configured to detect a temperature sensed by a temperature sensor 124 (S120). The temperature sensor 124 may be configured to detect a temperature of a coolant that cools the on-board charger 120. In the S110 step, upon detecting the charging request, the controller 122 ay be configured to determine the temperature sensed by the temperature sensor 124 at a predetermined time interval (e.g., 5 minutes, 10 minutes, etc.). The predetermined time interval may be changed depending on a design aspect.

Once the controller 122 detects the temperature of the on-board charger, the controller 122 may be configured to determine whether the detected temperature of the on-board charger is within a predetermined temperature range (e.g., about 50° C.~55° C.) (S130). For example, the predetermined temperature range may be, as shown in FIGS. 4 to 6, a coolant temperature range of the on-board charger 120 where charging efficiency and charging output of the on-board charger 120 are optimal.

Figure 4:
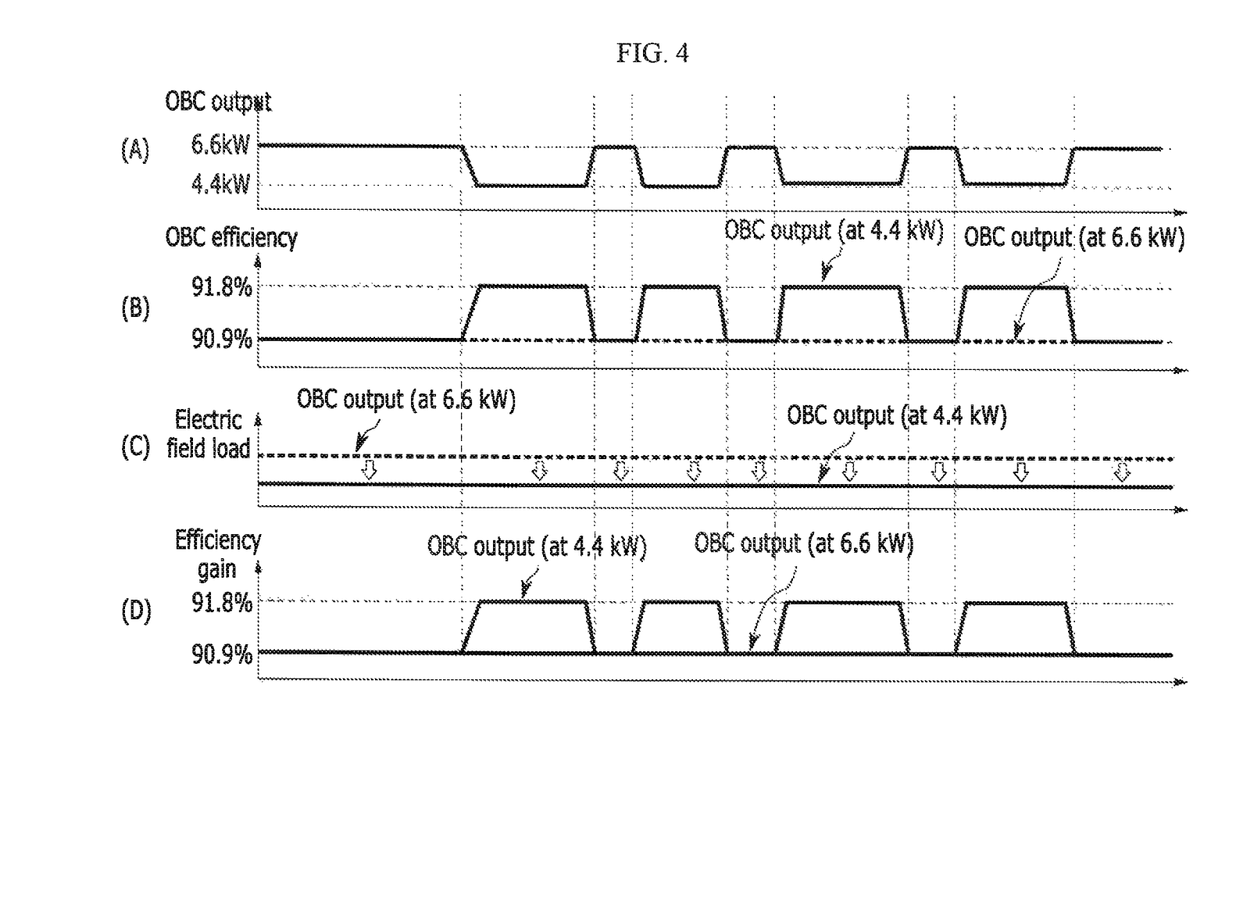
FIG. 4 is an exemplary graph for describing the slow charging method of the environmentally-friendly vehicle and the on-board charger according to an exemplary embodiment of the present invention.
Figure 5:
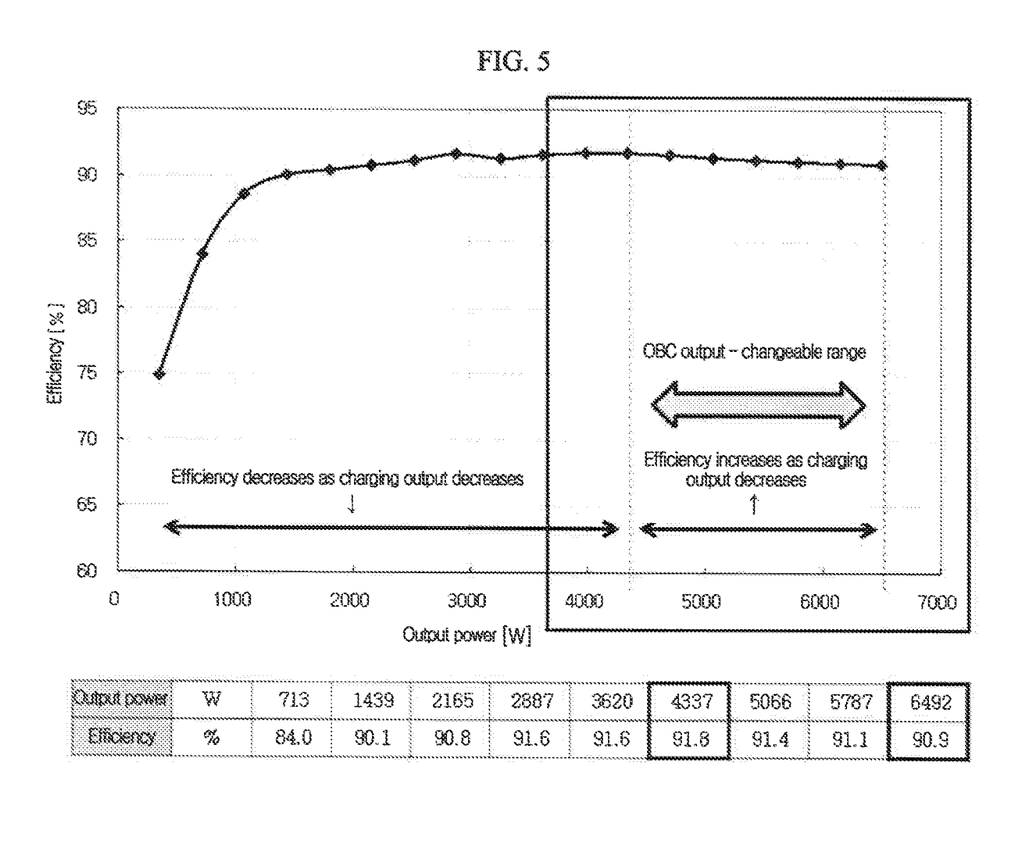
FIGS. 5 and 6 are exemplary graphs/tables for describing the slow charging method of the environmentally-friendly vehicle according to an exemplary embodiment of the present invention.
Figure 6:
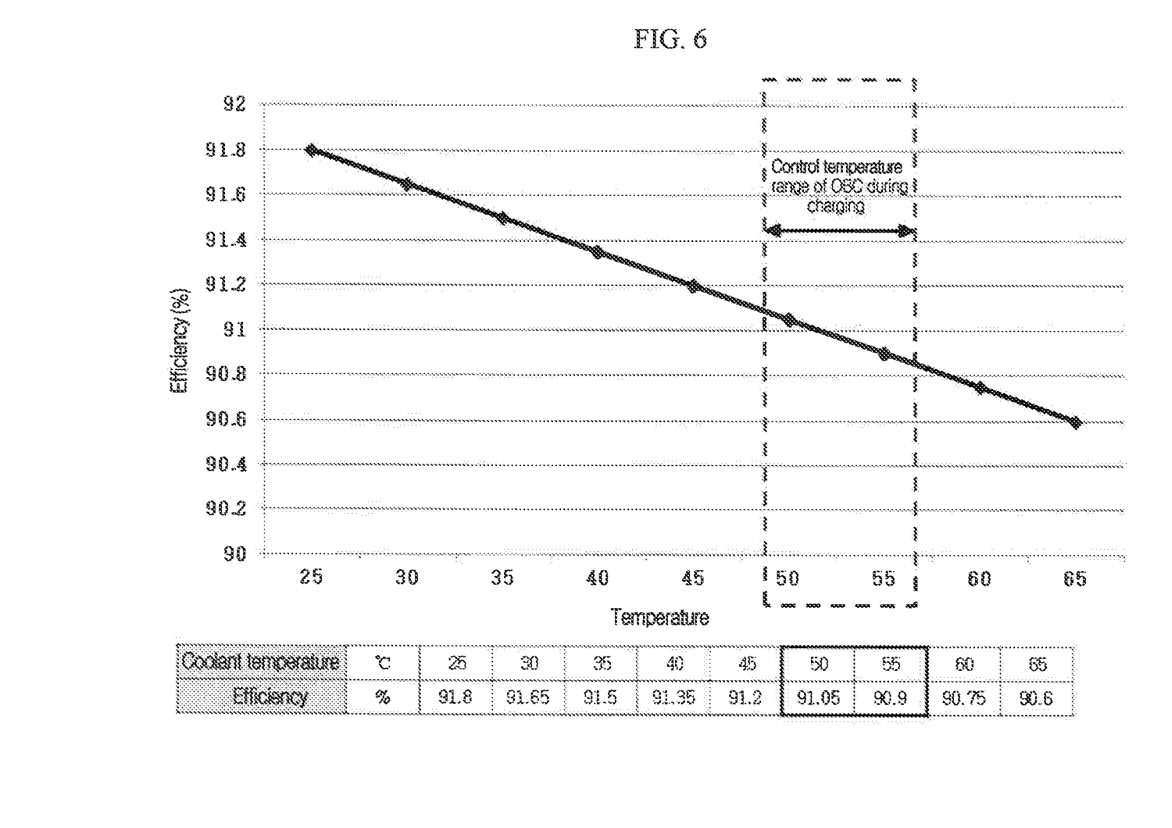

Referring to FIGS. 4 to 6, it can be seen that the on-board charger 120 may have optimal combination of the charging efficiency and charging output in the coolant temperature range of about 50° C. to 55° C. In the S130 step, when the detected temperature of the on-board charger is determined to be within the predetermined temperature range, the controller 122 may be configured to operate the output adjuster 126 to adjust the charging output of the on-board charger 120 to a predetermined value (e.g., about 4.4 kW) (S140).

The predetermined value (e.g., about 4.4 kW) may be set to be less than the previous charging output of the on-board charger (e.g., about 6.6 kW) since, when the charging output is adjusted to the predetermined value, the charging time may increase but charging efficiency may also increase compared with that of the previous charging output (e.g., about 6.6 kW), thereby reducing charging cost. The charging cost is a more important factor than the charging time because the environmental)y-friendly vehicle is generally charged during the night (e.g., when the vehicle is not being driven for substantial periods of time).

When the controller 122 provides a charging output change signal (e.g., adjustment signal) to the output adjuster 126, the output adjuster 126 may be configured to charge a battery 130 of the environmentally-friendly vehicle with the charging output of the on-board charger 120 adjusted by the controller 122 (S140). Meanwhile, in the step S130, when the controller 122 determines that the temperature of the on-board charger 120 is out of the predetermined temperature range (e.g., beyond the predetermined temperature range), the controller may be configured to operate the output adjuster 126 to maintain the charging output of the on-board charger 120 at the current value, for example, at about 6.6 kW (S135).

As described above, according to the exemplary embodiment of the present invention, the charging output of the on-board charger may be adjusted based on the temperature thereof to improve the charging efficiency and to save the charging cost.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the accompanying claims.

DESCRIPTION OF SYMBOLS

120: on-board charger
122: controller
124: temperature sensor
126: output adjuster
130: battery

What is claimed is:

1. A slow charging method of a vehicle including an on-board charger, comprising:
    detecting, by a controller, a charging request;
    detecting, by the controller, temperature of the on-board charger in response to detecting the charging request;
    determining, by the controller, whether the temperature of the on-board charger is within a predetermined temperature range;
    adjusting, by the controller, a charging output of the on-board charger to a predetermined value when the temperature of the on-board charger is within the predetermined temperature range; and
    charging, by the controller, a battery of the vehicle with the adjusted charging output of the on-board charger,
    wherein the adjusted charging output of the on-board charger is less than a previous charging output of the on-board charger, and
    a charging time of the adjusted charging output is greater than that of the previous charging output.

2. The method of claim 1, wherein the adjusted charging output of the on-board charger is about 4.4 kW, and the previous charging output of the on-board charger is about 6.6 kW.

3. The method of claim 1, further comprising:
    maintaining, by the controller, the charging output of the on-board charger when the temperature of the on-board charger is beyond the predetermined temperature range.

4. The method of claim 1, wherein the temperature of the on-board charger is detected at a predetermined time interval.

5. An on-board charger of a vehicle, comprising:
    a temperature sensor configured to detect a temperature of the on-board charger; and
    a controller configured to:
    variably adjust a charging output of the on-board charger based on the temperature the on-board charger; detect a charging request; detect temperature of the on-board charger in response to detecting the charging request; determine whether the temperature of the on-board charger is within a predetermined temperature range; adjust a charging output of the on-board charger to a predetermined value when the temperature of the on-board is within the predetermined temperature range; and charge a battery of the vehicle with the adjusted charging output of the on-board charger,
    wherein the adjusted charging output of the on-board charger is less than a previous charging output of the on-board charger, and
    a charging time of the adjusted charging output is greater than that of the previous charging output.

6. The on-board charger of claim 5, wherein the adjusted charging output of the on-board charger is about 4.4 kW, and the previous charging output of the on-board charger is about 6.6 kW.

7. The on-board charger of claim 5, wherein the controller is further configured to:

maintain the charging output of the on-board charger when the temperature of the on-board charger is beyond the predetermined temperature range.

8. The on-board charger of claim 5, wherein the temperature of the on-board charger is detected at a predetermined time interval.

9. A non-transitory computer readable medium containing program instructions executed by a controller, the computer readable medium comprising:
   program instructions that detect a charging request;
   program instructions that detect temperature of the on-board charger in response to detecting the charging request;
   program instructions that determine whether the temperature of the on-board charger is within a predetermined temperature range;
   program instructions that adjust a charging output of the on-board charger to a predetermined value when the temperature of the on-board charger is within the predetermined temperature range; and
   program instructions that charge a battery of the vehicle with the adjusted charging output of the on-board charger,
   wherein the adjusted charging output of the on-board charger is less than a previous charging output of the on-board charger, and
   a charging time of the adjusted charging output is greater than that of the previous charging output.

10. The non-transitory computer readable medium of claim 9, wherein the adjusted charging output of the on-board charger is about 4.4 kW, and the previous charging output of the on-board charger is about 6.6 kW.

11. The non-transitory computer readable medium of claim 9, further comprising:
   program instructions that maintain the charging output of the on-board charger when the temperature of the on-board charger is beyond the predetermined temperature range.

12. The non-transitory computer readable medium of claim 9, wherein the temperature of the on-board charger is detected at a predetermined time interval.

* * * * *